Nov. 12, 1968    T. O. SUMMERS    3,410,357
GYRO STABILIZED VEHICLE
Filed March 31, 1966    6 Sheets-Sheet 1
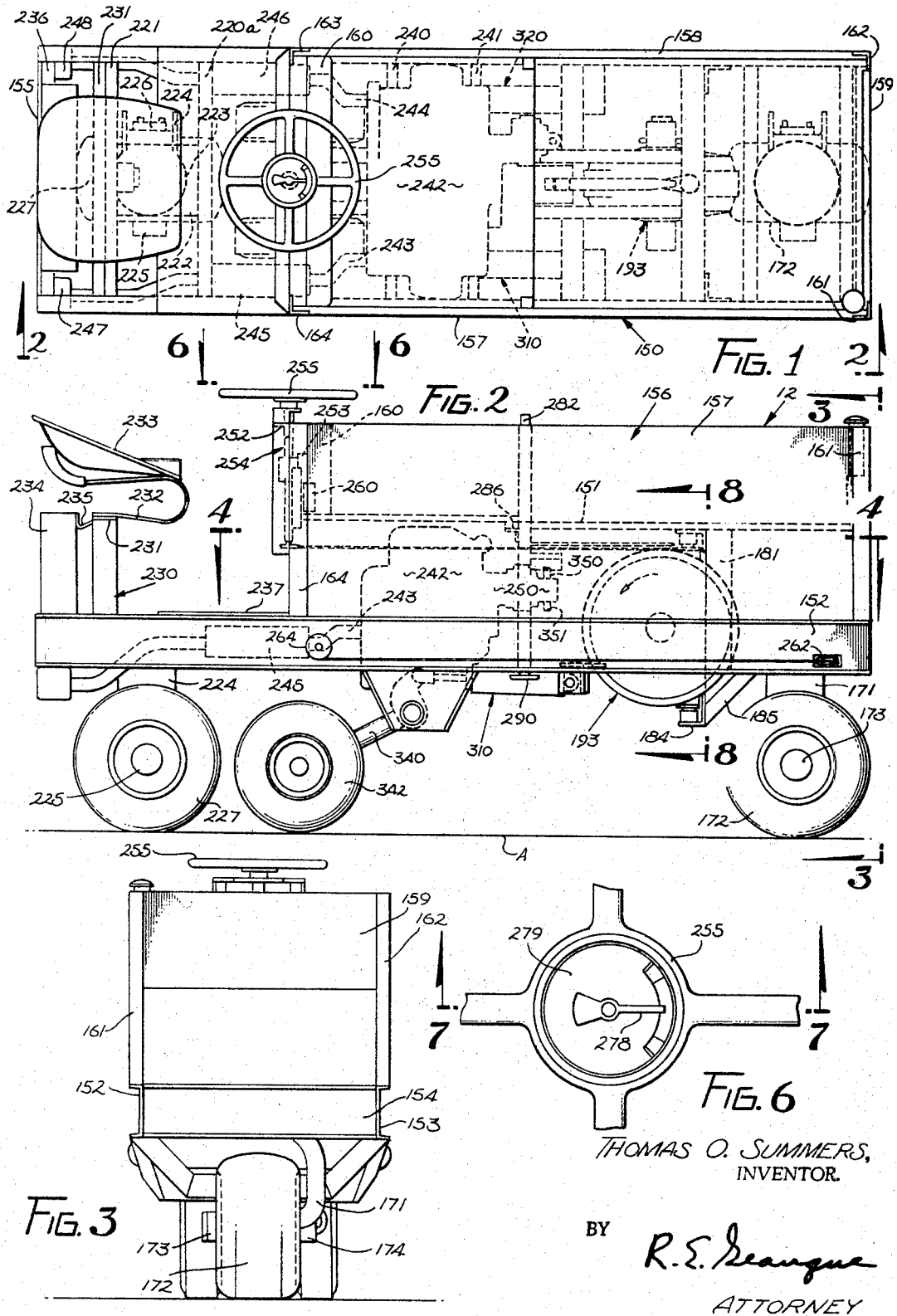
THOMAS O. SUMMERS,
INVENTOR.
BY R. E. Geauque
ATTORNEY

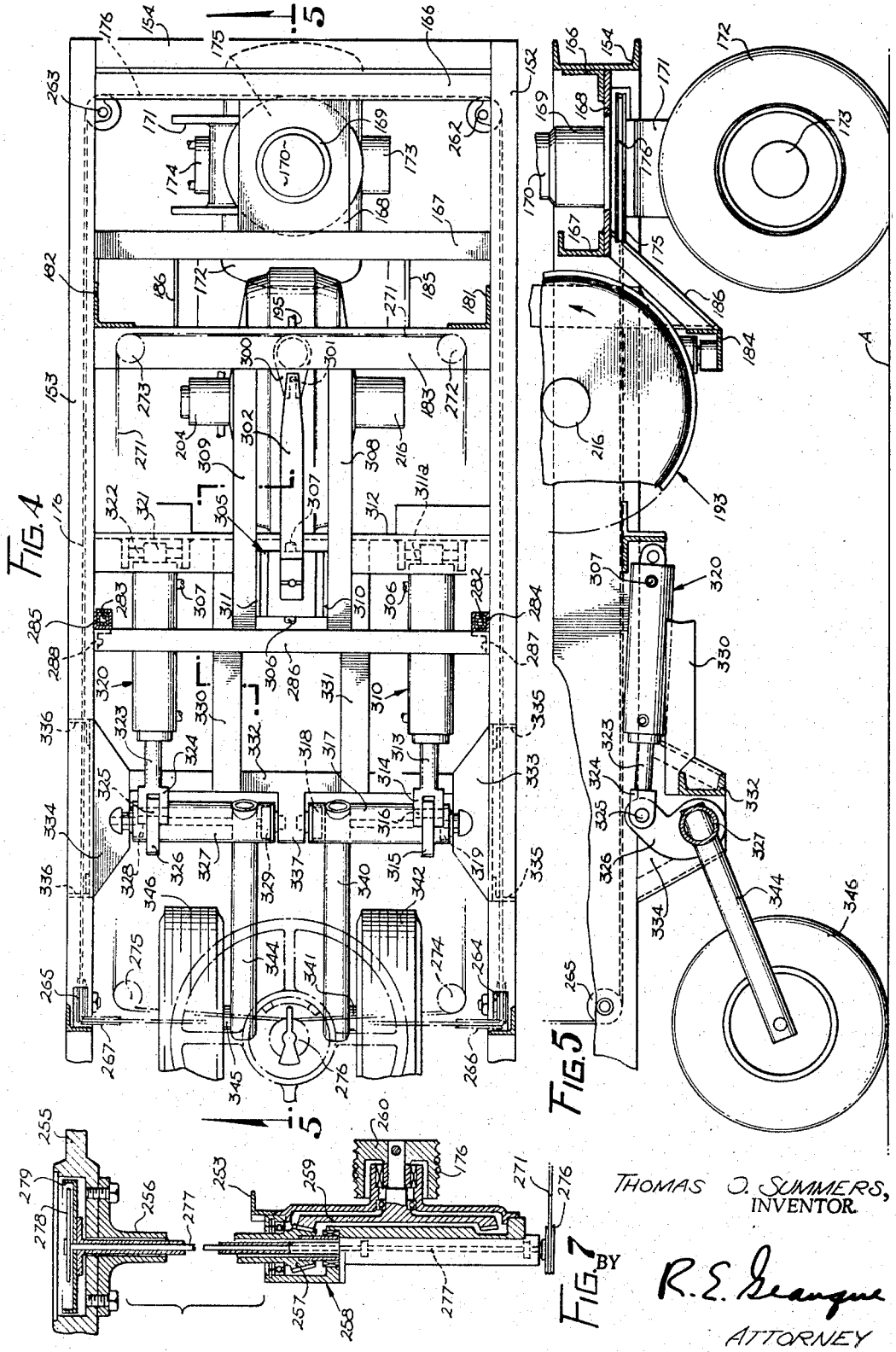

Nov. 12, 1968 T. O. SUMMERS 3,410,357
GYRO STABILIZED VEHICLE
Filed March 31, 1966 6 Sheets-Sheet 3
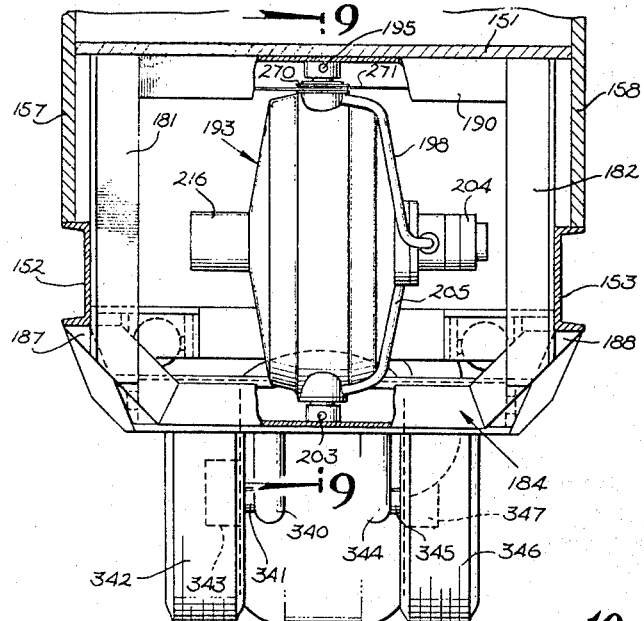
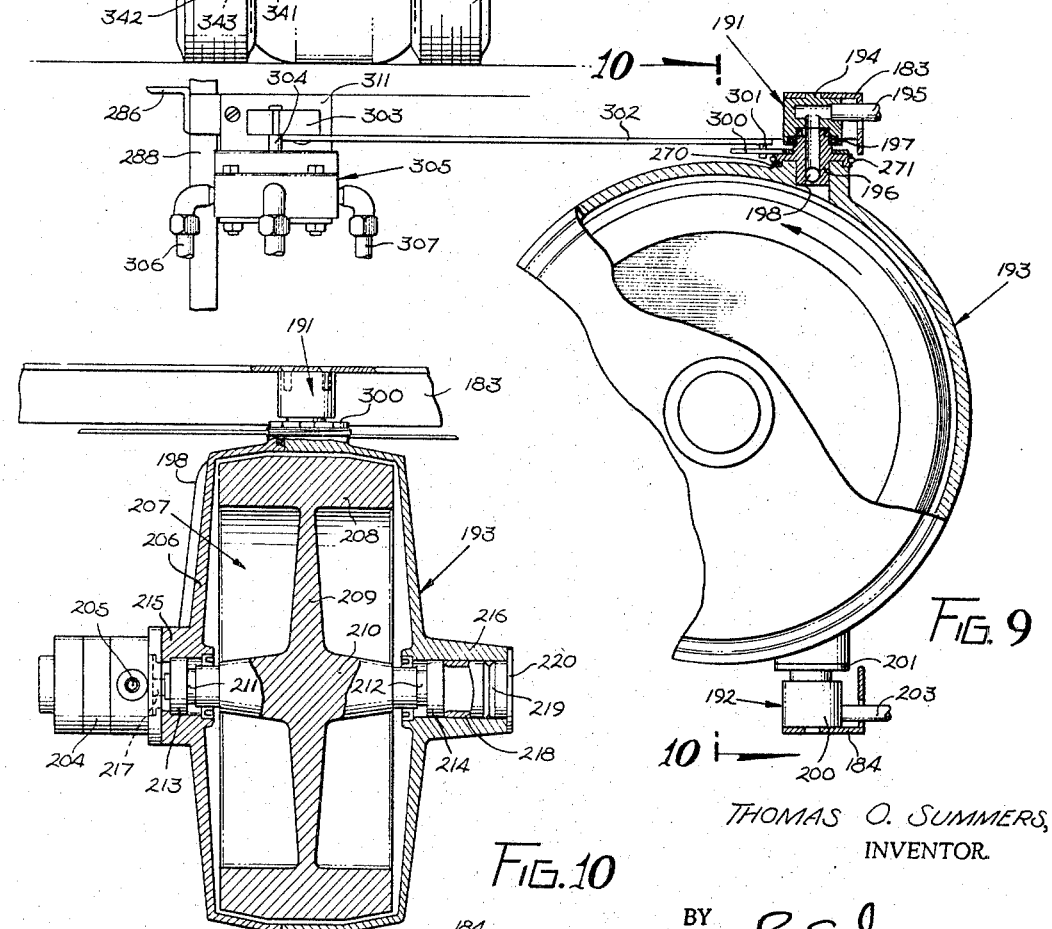
THOMAS O. SUMMERS,
INVENTOR.
BY R. E. Geangue
ATTORNEY

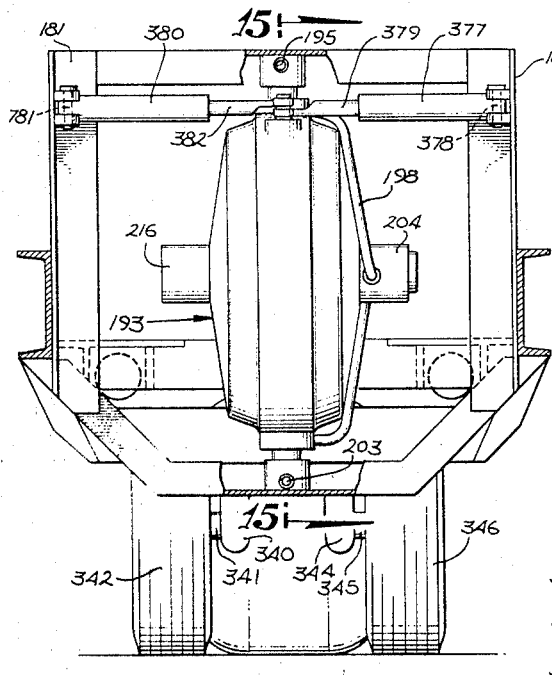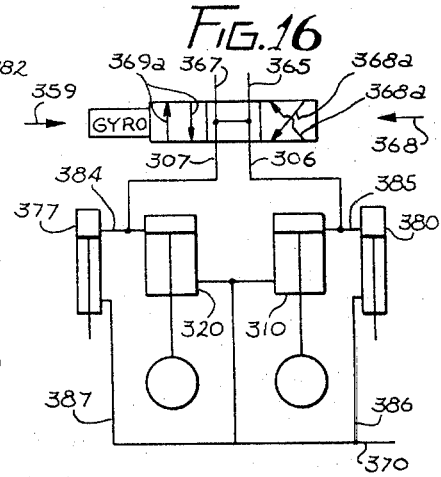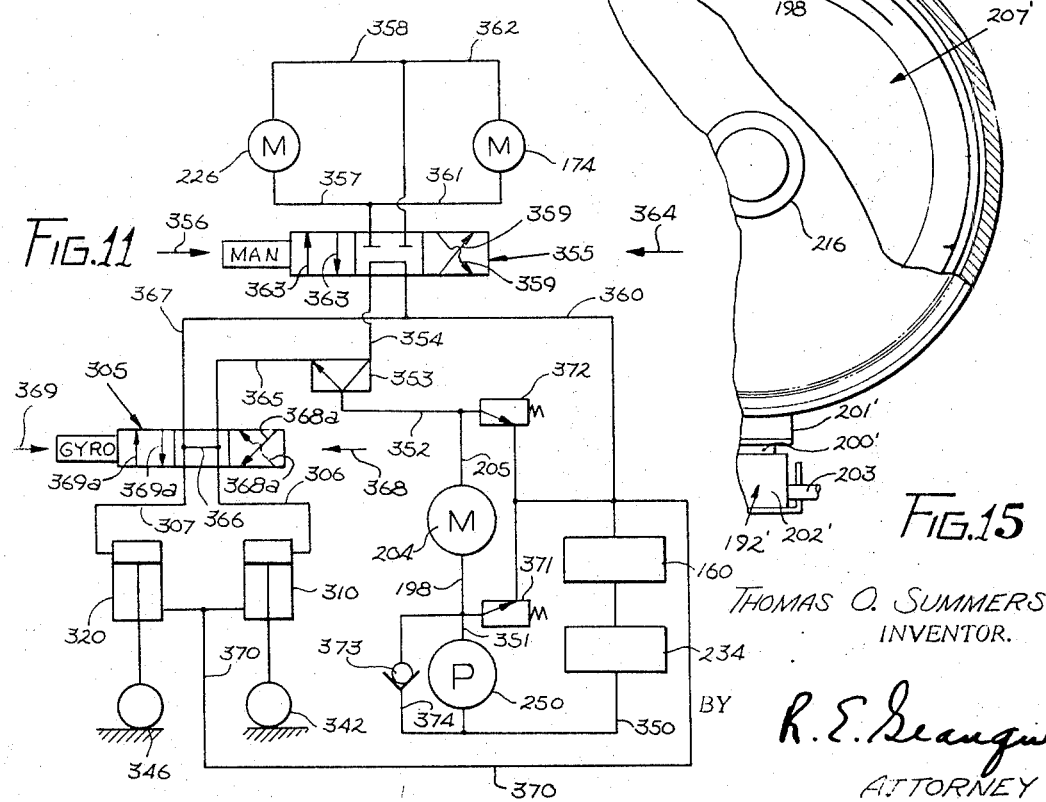

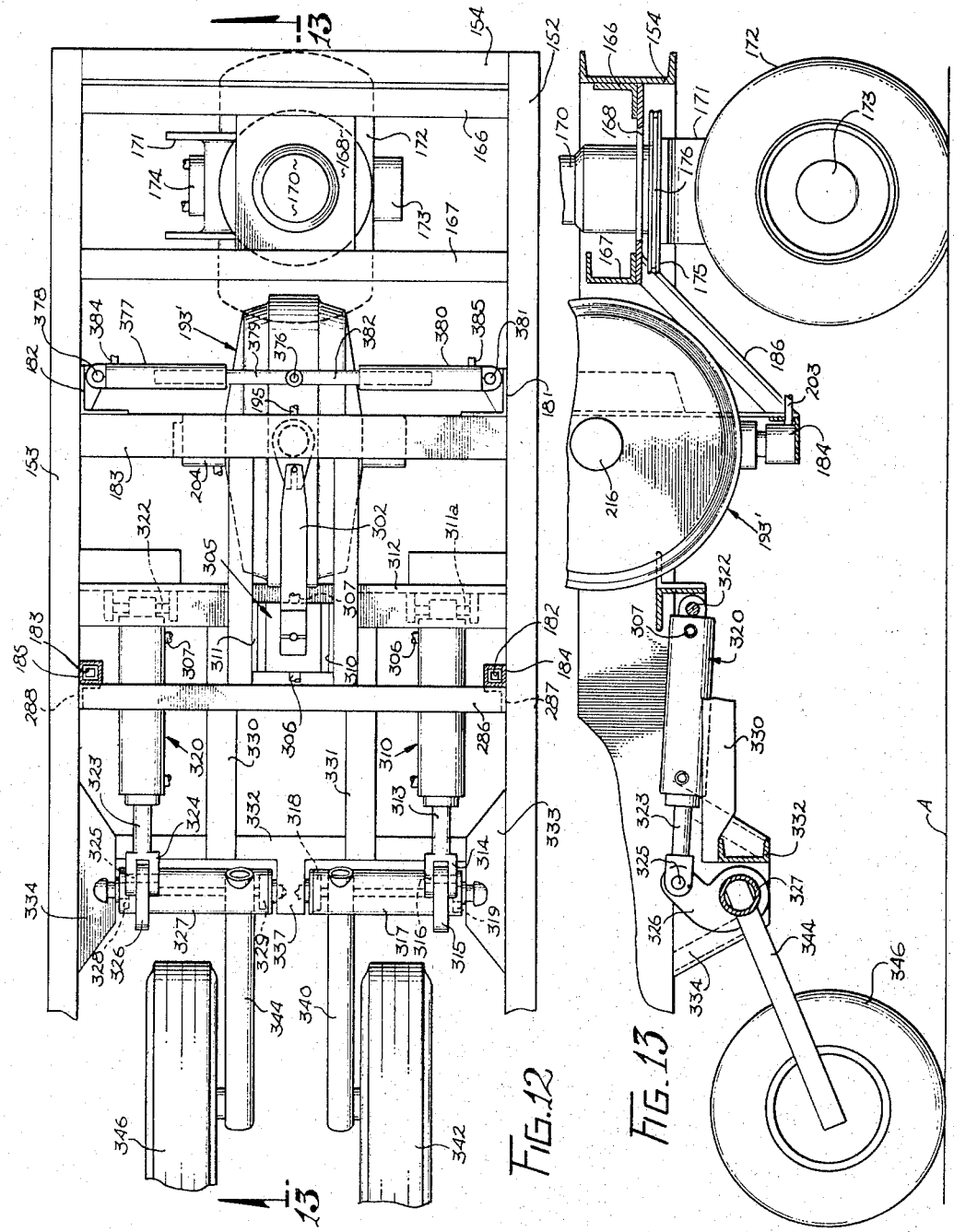

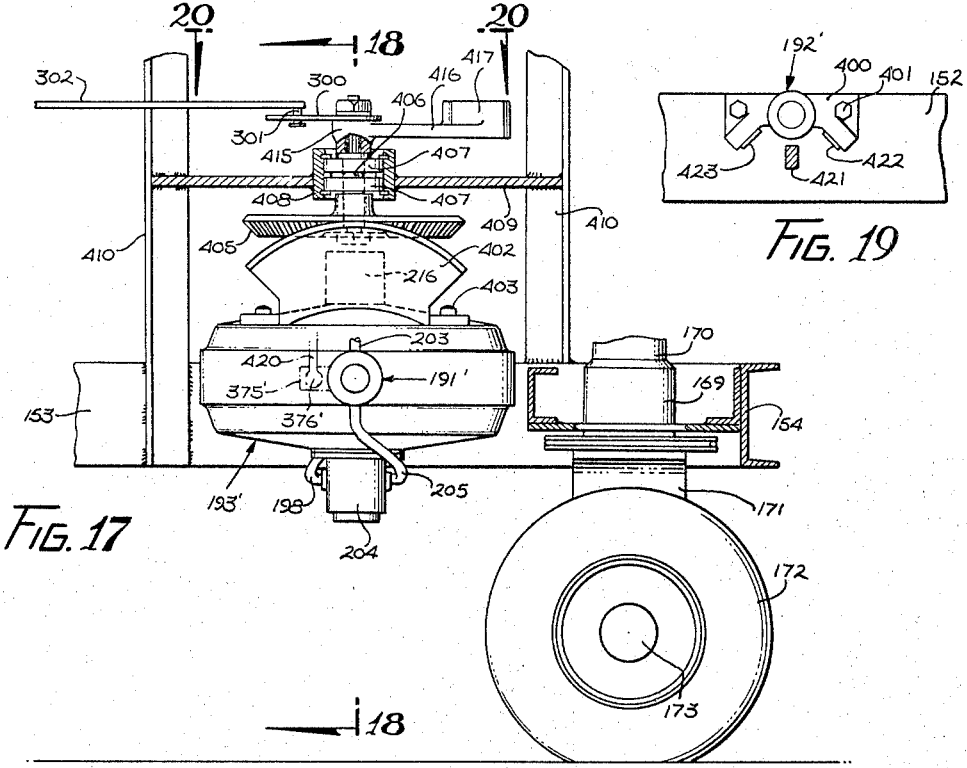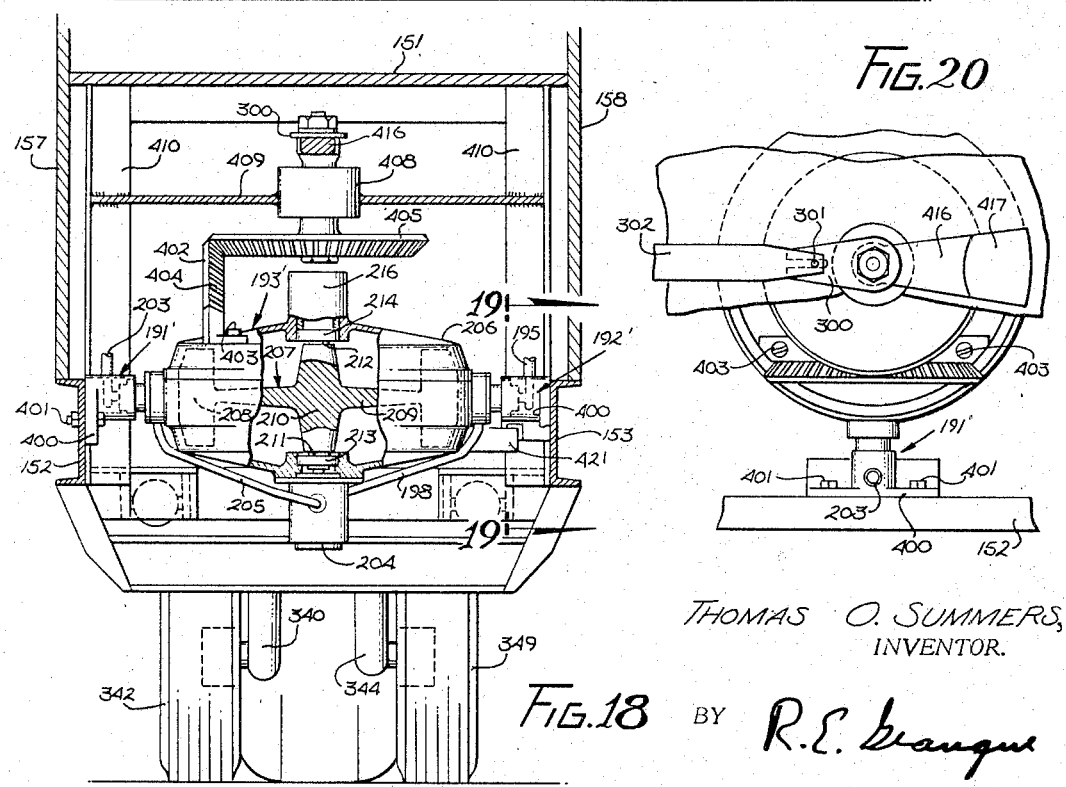
Nov. 12, 1968    T. O. SUMMERS    3,410,357
GYRO STABILIZED VEHICLE
Filed March 31, 1966    6 Sheets-Sheet 6
THOMAS O. SUMMERS,
INVENTOR.
BY R.E. Granger
ATTORNEY

United States Patent Office 3,410,357
Patented Nov. 12, 1968

3,410,357
GYRO STABILIZED VEHICLE
Thomas O. Summers, 3663 Royal Woods Drive,
Sherman Oaks, Calif. 91403
Filed Mar. 31, 1966, Ser. No. 539,186
32 Claims. (Cl. 180—30)

ABSTRACT OF THE DISCLOSURE

A motorcycle-like vehicle is roll stabilized by precession of a gyro frame containing a gyro rotor of high moment of inertia spinning at high speed. The frame is pivotally secured to the chassis of the vehicle for unrestrained precessional freedom about an axis perpendicular to both the roll axis of the vehicle and the spin axis of the gyro. When random roll torque precesses the frame, equal and opposite internal gyroscopic countertorque keeps the vehicle from tipping. When the frame is precessed away from its normal position, a sensor activates motors capable of selectively applying precessional roll torque to the vehicle. This torque precesses the frame toward its normal position. Selective precessional torque also is applied to the frame to cause roll precession of the vehicle; which precession produces equilibriating internal gyroscopic countertorque. This countertorque keeps the frame from being displaced by the precessional frame torque. The precessional frame torque, a function of the commanded roll torque, precesses the vehicle into an equilibrium position in which the commanded roll torque is substantially zero.

---

This invention relates to gyro stabilized vehicles and more particularly to gyro stabilized center-tracking automotive vehicles supported on running wheels arranged in tandem to allow substantial attitude variations or banking freedom about a roll axis passing through the points of contact of the wheels with the ground. By way of example and without any intent to limit its application, the invention is herein illustrated and described in vehicle configurations designed to aid foresters in transporting cargo over rugged mountain trails; but, the invention also finds usefulness in monorail vehicles, motorcycles, two-wheeled automobiles, and other vehicles supported normally in unstable equilibrium.

In the first embodiment of the invention chosen for illustration, a gyro rotor bearing case or gyro frame is pivotally supported on a trail vehicle for oscillation about an axis at right angles to both the roll axis of the vehicle and the spin axis of the rotor, so that the gyro proper is free to move relative to the vehicle about the pivot axis of the gyro frame and to roll with but not relative to the vehicle about its roll axis. The spin axis of the rotor, the pivot axis of the gyro frame, and the roll axis common to the vehicle and gyro are thus at right angles to each other; but, of course, variations from such an orthogonal orientation can be made with little or no adverse effect. Since the spin axis is free to precess in response to moments about the roll axis of the vehicle, it is important that the spin axis and gyro frame be contained in the vicinity of their normal positions. In a preferred embodiment of the invention, the normal or centered position of the spin axis is at right angles to the common roll axis of the vehicle and gyro; or, in other words, is parallel to the axis of rotation of the rear running wheel of the vehicle.

So long as the spin axis and gyro frame are maintained in their normal position, a disturbing roll moment, that is, a disturbance or loss of roll equilibrium, cannot roll the vehicle. Loss of roll equilibrium, however, is manifested by gyro precession, and equilibrium must be restored before the gyro spin axis is precessed into alignment with the roll axis. In this position the gyro ceases to resist roll disturbances. Actually, the pivoted gyro frame may be provided with stops or rubber bumpers, limiting its angular freedom, and resistance to the rolling moment will cease when the frame encounters either bumper. Ideally the gyro spin axis should be maintained in the vicinity of its normal centered position. This may be accomplished by detecting departure of the spin axis and gyro frame from the normal center position and applying a moment about the roll axis of the vehicle in a direction to precess the spin axis and gyro frame toward the normal centered position. It is apparent that so long as the spin axis is maintained in its normal centered position by such a roll moment, roll equilibrium of the vehicle is maintained.

A novel means of applying such a roll moment is provided by the present invention to render the trail trucks disclosed herein, self-balancing. Upon a displacement of the gyro from its normal position, one or the other of a pair of mechanical torquing arms, one on each side of the vehicle, is energized to exert an upward force about the roll axis and a downward reaction force against the earth. While the other arm may also react against the earth lightly, it will produce only a negligible reaction force and consequent drag compared to that produced by the energized arm.

When the vehicle is in motion this downward reaction force of the energized arm against the earth effects a drag tending to turn the vehicle, either to the right or to the left, toward the side of the vehicle retarded by the greater drag. A roll moment, therefore, is produced by centrifugal force, according to the differential force exerted by the torquing arms against the ground.

A roll moment also is produced by the differential action of the torquing arms against the ground, which roll moment is in the same direction as the roll moment produced by centrifugal force. When one of the torquing arms or members pushes downward against the earth with greater force than the other, the equal and opposite upward force produces a roll moment about the roll axis of the vehicle that is in the same direction as the roll moment resulting from drag caused by downward force. The roll moments produced are therefore augmentative.

The roll moment produced by drag due to downward force, however, is effective only when the vehicle is in motion. On the other hand the roll moment produced by upward force, is effective regardless of whether or not the vehicle is in motion.

To preclude excessive torquing arm wear and to reduce drag on the vehicle, preferably a small wheel is attached to the trailing end of each torquing member, so that only the wheel portion of each torquing arm contacts the ground. It is obvious, however, that these small wheels may be eliminated, and the torquing arms allowed to directly engage the ground or supporting surface of the vehicle.

Each arm is pivoted independently on the vehicle and is motor or piston operated according to displacement of the pivoted gyro frame from its normal position. Upon a displacement of the gyro frame from its normal position, a hydraulic valve sensor directs fluid under pressure to one or the other of the torquing pistons. The hydraulic valve sensing is such that when the gyro frame is displaced from its normal position, the resulting piston pressure effects a roll torque in a direction to restore the gyro frame to its normal position and the vehicle to an equilibrium position.

Effecting roll equilibrium by this simple expedient of pushing against the earth is inherently faster than moving a large mass relative to the roll axis, as proposed heretofore. The torquing wheels normally remain in contact with the ground so that very little movement is necessary to effect a roll moment. Also the inertia of the torquing apparatus can be kept low. In contrast, effecting roll equilibrium by lateral movement of a mass is conducive to time lag according to the distance the mass must move to effect a given roll moment. If this distance is made large, the time lag is high. If it is made small, the mass must be increased correspondingly, which increases the inertia proportionately, and the time lag will remain high.

Generally speaking, gyroscopic stabilization systems for vehicles supported normally in unstable equilibrium, as are the vehicles of the present invention, rely upon the gyroscope for short term stability only, since the gyroscope cannot long resist loss of roll equilibrium. Any roll disturbance resulting in a loss of roll equilibrium must be restored before the gyro ceases to resist the disturbance and allows the vehicle to tip over. This imposes a time limit in effecting such restoration according to the angular momentum of the gyroscope. Accordingly, the low time lag of the equilibrium restoring apparatus of the present invention makes it possible to use comparatively small gyropscopes to stabilize center tracking vehicles in contrast to the large gyroscopes required to stabilize such vehicles in the past.

While the roll torquing system of the present invention effects roll equilibrium by maintaining the gyro frame in its normal position about its pivot axis, roll torquing does not restrct roll drift of the gyro frame. Since the vehicle and the gyro frame cannot roll relative to each other, the normal vertical center plane of the vehicle may drift with the gyro frame in roll, away from the equilibrium attitude and produce a roll moment which, as long as the tilt continues, must be equilibrated by the exertion of roll torque to maintain roll equilibrium.

To keep the vehicle from tipping over, it must not be permitted to tilt sufficiently to move the center of gravity of the vehicle outboard of the vertical plane of either torquing wheel. Novel means are disclosed and claimed herein for detecting and controlling roll tilt of the vehicle, and for balancing the vehicle in an upright position.

The mechanism for detecting and controlling roll tilt of the vehicle is automatic in operation. In one embodiment of the invention, the gyro frame is supported eccentrically about a vertical pivot axis. That is, the center of gravity of the gyro rotor is removed from the vertical pivot axis so that upon any roll displacement of the vehicle from a vertical attitude, a gravity moment will develop about the pivot axis in a direction to precess the vehicle into a plumb line attitude. A similar result may be obtained by operatively connecting a vertically pivoted pendulous mass to the gyro frame.

In another embodiment of the invention, the detecting and controlling of vehicle tilt is also automatic in operation. A pair of comparatively small torquing motors or pistons are operatively connected to the gyro frame to precess the vehicle about its roll axis. The respective small gyro frame torquing motors or pistons are connected in parallel with the larger side wheel motors or pistons which torque the vehicle about its roll axis.

When the vehicle becomes unbalanced about its roll axis, one of the other of the torquing wheel pistons becomes pressurized accordingly. This causes a force to be exerted against the earth and an equilibrating torque about the roll axis is produced according to the unbalance or lateral tilt. Pressure equal to the pressure developed in the pressurized torquing wheel piston also develops in the corresponding small torquing piston, and the arrangement is such that the roll moment produced by the torquing piston about the gyro frame axis is in a direction to roll the vehicle and relieve piston pressure. Thus, the piston operated torquing wheels press only lightly against the ground and the vehicle is maintained in an equilibrium attitude.

It is therefore an object of the present invention to provide a gyro stabilized center tracking vehicle, of reduced complexity in which the gyro spin axis is maintained in its normal position by forces reacting against the earth, and in which these forces are minimized by torquing the gyro frame about its pivot axis.

Another object of the invention is to provide a gyro stabilized center-tracking trail vehicle in which a gravity sensitive mass applies a torque to the gyro frame in a direction to erect the vehicle upon tilt from a vertical or plumb line attitude.

Another object of the invention is to provide a gyro stabilized, center-tracking vehicle, in which a reaction member maintains the gyro spin axis in its normal position by pushing against a reaction surface in response to gyro frame displacement from its normal position, and in which the vehicle is maintained in a plumb line attitude by a gravity sensitive mass adapted to torque the gyro frame in a direction to erect the vehicle upon tilt from a plumb line attitude.

Another object of the present invention is to provide a gyro stabilized, center-tracking vehicle, in which fluid motors are employed to operate torquing wheels to apply a roll torque to the vehicle in a direction to maintain the gyro spin axis in its normal position, with the flow of pressure fluid to the motors being controlled by gyro frame displacement, and in which the vehicle is erected in roll by a torque applied about the gyro frame axis.

Another object of the present invention is to provide a gyro stabilized center-tracking vehicle in which a torque applied about the gyro frame axis is a function of a torque applied about the vehicle roll axis.

Another object of the invention is to provide a gyro stabilization system in which the center of gravity of the gyro rotor is offset with respect to the pivot axis of the gyro frame to render the gyro frame sensitive to gravity upon tilt of the vehicle.

Another object of the present invention is to provide novel means for imparting stability to an unstable vehicle.

Another object is to provide a gyro stabilizing means to impart stability to an unstable center tracking vehicle.

These and other objects of the invention not specifically set forth above will become readily apparent from the accompanying description and drawings in which:

FIGURE 1 is a top plan view of the first embodiment of the invention showing the location of the engine and the gyro assembly;

FIGURE 2 is a side elevational view along line 2—2 of FIGURE 1 showing the torquing wheels located intermediate the driving wheels of the vehicle;

FIGURE 3 is a front elevational view along line 3—3 of FIGURE 2 illustrating the front drive wheel;

FIGURE 4 is a horizontal section along lines 4—7 of FIGURE 2 showing the pendulously supported gyro frame and the actuators for the torquing wheels;

FIGURE 5 is a partial vertical section along line 5—5 of FIGURE 4 illustrating the mounting for the torquing wheels;

FIGURE 6 is an enlarged top plan view along line 6—6 of FIGURE 2 showing the indicator for illustrating the position of the gyro frame;

FIGURE 7 is a vertical section along line 7—7 of FIGURE 6 showing the mechanism for steering the vehicle and driving the indicator;

FIGURE 8 is a transverse vertical section along line 8—8 of FIGURE 2 illustrating the structure for mounting the gyro frame;

FIGURE 9 is a vertical section along line 9—9 of FIGURE 8 showing the bearing assemblies for eccentrically supporting the gyro frame;

FIGURE 10 is a transverse vertical section along line 10—10 of FIGURE 9 illustrating the gyro frame and gyro rotor;

FIGURE 11 is a schematic illustration of the hydraulic system for driving the vehicle and actuating the torquing wheels;

FIGURE 12 is a partial top plan view of a second embodiment of the invention taken along the same plane as FIGURE 4 of the prior embodiment;

FIGURE 13 is a partial vertical section along line 13—13 of FIGURE 12 showing the gyro assembly and torquing wheels;

FIGURE 14 is a vertical section taken on a plane similar to that of FIGURE 8 of the prior embodiment showing the balanced gyro assembly, the torquing motors and the torquing wheels;

FIGURE 15 is a partial vertical section along line 15—15 of FIGURE 14 showing the bearing assemblies for the gyro frame with the frame axis passing through the center of mass of the frame and rotor;

FIGURE 16 is a partial schematic showing the manner in which FIGURE 11 is modified to include the torquing motors;

FIGURE 17 is a fragmentary section view similar to FIGURES 5 and 13 showing the gyro mounted with the rotor axis vertical;

FIGURE 18 is a fragmentary transverse vertical sectional view taken on line 18—18 of FIGURE 17;

FIGURE 19 is a vertical sectional view taken on line 19—19 of FIGURE 18 and showing stops for limiting precession of the gyro about the frame axis; and FIGURE 20 is a fragmentary top plan view taken on line 20—20 of FIGURE 17.

In the first embodiment of the invention, illustrated in FIGURES 1 through 11, a trail truck or vehicle 150 has a frame comprised of side channel members 152 and 153 and end channel members 154 and 155. The load carrying compartment 156 consists of open top container section having sides 157 and 158, a front end 159 and a rear end consisting of oil tank 160. Also, the compartment has a bottom panel 151 so that loads can be carried in the compartment. The sides 157 and 158 and ends 159 and 160 are supported in position by four corner angle irons 161, 162, 163 and 164 which rise upright from the side channels 152 and 153 and are secured thereto. The sides 157 and 158, end 159 and the bottom 151 can be fabricated of plywood and as illustrated in FIGURE 8, the lower edges of the sides 157 and 158 and front end panel 159 extend downwardly below bottom 151 and rest on the side channels 152, 153 and 154, respectively.

A pair of spaced angle irons 166 and 167 extend between the side channels 152 and 153 and support a plate 168 (see FIGURE 5). An upright sleeve 169 extends from plate 168 and contains bearings (not shown) for post 170 connected with strut 171 for the wheel 172. The strut 171 has a channel cross-section and the end of the strut supports a bearing structure 173 which extends through the hub of the wheel 172 and supports the wheel for rotation. Also, a motor 174 is supported at one end of the bearing structure and its output shaft (not shown) is keyed up to the wheel in order to drive the wheel. The strut 171 has a rim 175 for receiving cable 176 which is moved by the steering mechanism to guide the vehicle in a manner later to be described.

A pair of vertical angle irons 181 and 182 are connected to side frame channels 152 and 153, respectively, and to an angle 183 extending between the side frames (see FIGURE 5). These angles 181 and 182 also project downwardly to connect with one side of an angle iron 184 extending transversely across the bottom of the vehicle. A pair of brackets 185 and 186 extend between the angle iron 184 and the angle iron 167 in order to add additional support to the angle iron 184. Also, ends 187 and 188 of angle iron 184 are bent upwardly (see FIGURE 8) and are welded to the side channels 152 and 153, respectively. Bearing assemblies 191 and 192 are supported on top and bottom angles 183 and 184, respectively, to support the gyro frame (rotor support) 193 for rotation about an axis in line with the bearing assemblies. The structure of the bearing assembly 191 is illustrated in FIGURE 9 and comprises bearing housing 194 connected to angle 183 and containing a fluid inlet passageway 195. Also a shaft 196 is attached to the gyro frame 193 and projects into the housing 194 to be rotatably supported by bearing 197. The shaft 196 contains a passage 198 continually connecting passage 195 to the outside of the frame 193 for movement therewith. In a similar manner, assembly 192 comprises a bearing housing 200 connected to angle 184 and containing a fluid outlet passage 203. Shaft 201 is connected to frame 193 and is rotatably supported in bearing housing 200.

The gyro frame supports a fluid motor 204 which drives the gyro rotor. Referring to FIGURE 8, pressure fluid is introduced to the motor 204 through the passage 198 and fluid exhausts from the motor to the passage 205 and then through bearing assembly 192 into passage 203. As shown in FIGURE 10, the frame 193 comprises a casing 206 which contains gyro rotor 207. The outer ring 208 of the rotor is connected by web 209 to a central hub 210 from which extends shaft 211 and 212. Bearings 213 and 214 are located in casing extensions 215 and 216, respectively, and rotatably support shafts 211 and 212, respectively. Drive shaft 217 of the motor 204 inserts into the end of the shaft 211 in order to spin the gyro rotor. The casing extension 216 contains a spacer 218, a preload spring 219 and a cap 220, all of which serve to counterbalance the weight of the motor 204. It is therefore apparent that the rotor 207 can spin about its spin axis within the casing 206 and that the casing can pivot about the axis of the bearing assemblies 191 and 192.

Referring to FIGURE 1, a pair of angle irons 220a and 221 extend between the side channel frames 152 and 153 at the rear end of the vehicle and support a flat plate 222 to which is attached the upper platform plate 223 of the strut 224 for wheel 227. The lower end of the strut 224 supports a wheel bearing 225 and a wheel motor 226 which are similar in construction to the bearing 173 and motor 174 for the front wheel. However, since the upper platform plate 223 is rigidly fixed to the plate 222, the back wheel cannot be steered.

A U-shaped bracket 230 extends upwardly from the rear end of the side channels 152 and 153 and the flat upper section 231 is attached to the spring support 232 for the seat 233. Also, an oil cooler tank 234 projects upright from cross member 236 and is fixed to bracket 230 by a second bracket 235. A foot plate 237 extends across the channels 152 and 153 just to the rear of the uprights 164 and 163 in order to provide footing for the operator sitting in the seat 233. A pair of cradles 240 and 241 extend between the side channels 152 and 153 and support an internal combustion engine 242 of any well known construction. The engine exhausts through the passages 243 and 244 to mufflers 245 and 246, respectively, which lead to spark arresters 247 and 248, respectively. A hydraulic pump 250 is connected to the engine through a standard gear train contained within the casing of the engine and the output of the pump is connected to the motor 204 for the gyro rotor and to the motors 174 and 226 for the front and rear wheels, respectively.

A pair of angle irons 252 and 253 (see FIGURE 2) extend between the upright posts 163 and 164 and support a steering mechanism 254, said mechanism being shown in detail in FIGURE 7. A steering wheel 255 is secured to the steering column 256 which carries a gear 257 located within a housing 258. The gear 257 meshes with the gear 259 which is connected to a capstan 260 so that rotation of the steering wheel 255 directly rotates the capstan. Referring to FIGURE 4, the continuous cable 176 extends in opposite direction from the capstan 175 and passes around pulleys 262 and 263 mounted on the side channels 152 and 153, respectively, at the front end of the vehicle. A portion of the cable 176 then extends along each side channel to the rear pulleys 264 and 265 and then moves upwardly to the transverse pulleys 266 and 267 and then winds around the capstan 260. Thus, rotation of the capstan 260 will cause rotation of the capstan 175 to turn the front wheel 172 and change the direction of the vehicle.

As illustrated in FIGURE 9, the axis for the gyro frame 193 does not pass through the center of gravity of the combined rotor and frame since the axis is displaced forwardly from the center of gravity. Thus, the rotor and frame assembly is made pendulous about the frame axis and sensitive to any roll digression of the frame axis from vertical. The upper shaft 196 carries a pulley 270 around which is wrapped a continuous cord 271 and this cord extends around pulleys 272 and 273, along channel sides 152 and 153 to pulleys 274 and 275 and then transversely to the pulley wheel 276 at the lower end of the steering assembly 258. The pulley 276 is connected to the end of a shaft 277 which extends upwardly through the steering column 256 and connects with an indicator arm 278 located above a scale 279 in a well in a steering wheel 255. Thus, the position of the indicating arm 278 is an indication of the position of the gyro frame and can be observed by the operator. A pair of square parking struts 282 and 283 are slidable in support tubes 284 and 285, respectively, which are attached to a cross piece 286 supported just below the bottom 151 of the compartment by upright angle irons 287 and 288 welded to side channels 152 and 153, respectively. Each of the support struts carry a bottom pad 290 and have lock means for holding this pad in contact with the ground when it is desired to support the vehicle independently of the gyro system.

A fork 300 is also attached to the upper shaft 196 of the gyro frame 193 and this fork contains a slot that receives the pin 301 attached to a lever arm 302. The other end of the arm is connected to a block 303 attached to the end of the valve shaft 304. The valve shaft 304 controls the valve 305 in order to control the flow of fluid to the lines 306 and 307. A pair of longitudinal angles 308 and 309 extend between the cross angles 183 and 286 and support the valve 305 by attachment to side plates 310 and 311. The passage 306 connects with the cylinder 310 which is pivotally connected at one end to a pin 311a which is mounted on brackets attached to channel 312. The piston rod 313 extends from the other end of the cylinder and has a yoke 314 which is connected to a crank arm 315 by a pin 316. The arm 315 is welded to a sleeve 317 which is rotatably supported by bearings 318 and 319 inserted in the ends thereof. In a similar manner, the passage 307 connects with a cylinder 320 which is pivotally connected at one end to a pin 322 mounted on brackets attached to the angle iron 312. The piston rod 323 carries a yoke 324 which is pinned to a crank arm 326 by pin 325. The crank arm 326 is welded to a sleeve 327 supported for rotation by bearings 328 and 329 inserted into the opposite ends thereof. A pair of support arms 330 and 331 extend between angle 312 and the channel iron 332 which is also supported at its end by means of skirts 333 and 334 which are attached to the side channels 152 and 153, respectively, by means of a pair of angles 335 and 336, respectively, (see FIGURE 4). The end bearings 319 and 328 are supported by skirts 333 and 334, respectively, and end bearings 318 and 329 are supported by a projection 337 which is supported by the channel 332.

A shaft 340 has one end extending through and attached to sleeve 317 and the other end carries a shaft 341 which supports a first torquing wheel 342 on bearings 343. A second shaft 344 extends through and is connected to a sleeve 327 at one end and the other end connects with a shaft 345 which supports the torquing wheel 346 by means of bearings 347. When fluid is introduced to either cylinder 310 or 320, the associated wheel 342 or 346 will be forced downwardly against the ground to thereby place a torque on the vehicle about its roll axis and this torque will serve to precess the gyro frame back to its center position.

The operation of the first embodiment of the invention will be described in connection with the schematic illustration of FIGURE 11. When the vehicle is in its normal vertical position, the gyro frame axis is vertical and the spin axis of the rotor is perpendicular to the frame axis and to the roll axis A but displaced therefrom (see FIGURE 2). In the event that the vehicle is tipped from its normal vertical position, the gyro frame and rotor will tend to move about the frame axis under the force of gravity and gravity will place a torque upon the frame in a direction to precess the vehicle back to the vertical. At the same time, any deviation of the gyro frame from the longitudinal plane of the vehicle will cause movement of the lever 302 and operation of valve 305 to energize either cylinder 310 or 320 depending upon which way the vehicle moves from the vertical. The resulting cylinder force urges one of the torquing wheels against the ground to produce a torque on the vehicle about its roll axis and will precess the gyro frame back to its center position at which time the valve 305 is nulled and both wheels are then free to move without exerting any force on the vehicle.

Referring to FIGURE 11, the pump 250 is connected to the tank 160 and cooler 234 through fluid inlet line 350 and the outlet of the pump is connected through line 351 to the inlet passage 198 leading to the gyro motor 204. The gyro motor exhausts through line 205 to connect with line 352 containing a priority type flow divider 353 having one line 354 leading to the manually controlled three-position, four-way valve 355 located adjacent the steering wheel. Valve 355 controls the flow of fluid to the wheel motors 174 and 226 to control the movement of the vehicle. When the valve is moved in the direction of arrow 356, fluid flows through valve passage 363 and lines 357 and 361 to motors 226 and 174, respectively, and exhausts through lines 358 and 362 back to the tank 160 through the main exhaust line 360. With the valve 355 in this position, the vehicle will be driven in the forward direction. When it is desired to reverse the direction of drive of the motors, the valve 355 is moved in the direction of arrow 364 so that fluid is introduced to the motors through valve passages 359 and through lines 358 and 362 and exhausts from the motors through lines 357 and 361.

A second line 365 is connected to the priority side of the flow divider 353 and leads to the open center gyro controlled valve 305. When this valve is centered, fluid will flow from line 365 through center passage 366 and back through the return line 367 so that minimum pressure is placed on motors 310 and 320 connected to the torquing wheels 342 and 346, respectively. However, when a roll torque on the vehicle precesses the gyro frame 193 from its normal centered position, the valve 305 is moved in a direction to supply fluid to one of the motors 310, 320 depending on the direction of the roll torque. For example, if the roll torque is counterclockwise as viewed from the rear of the vehicle, the gyro frame will be precessed clockwise as viewed from the top of the vehicle. This precession will move valve 305 in the direction of arrow 368 to supply pressure fluid to motor 320 through a valve passage 368a and line 307. At the same time, motor 310 exhausts through line 306, a valve passage 368a and line 367. Fluid pressure produces a force upon the piston of the motor 320 and thereby forces the wheel 346 against the ground in order to produce a clockwise torque upon the vehicle.

On the other hand, if the roll torque on the vehicle is clockwise as viewed from the rear of the vehicle, the gyro frame will be precessed counterclockwise as viewed from the top of the vehicle. This precession will move valve 305 in the direction of arrow 369 to supply pressure fluid to a motor 310 through a valve passage 369a and line 306. At the same time, motor 320 exhausts through line 307, a valve passage 369a and line 367. Fluid pressure produces a force upon the piston of motor 310 and thereby forces the wheel 342 against the ground in order to place a counterclockwise torque upon the vehicle. The sides of the piston which are not pressurized are connected back to the tank 160 through common line 370.

The hydraulic system is provided with relief valves 371 and 372 on opposite sides of the gyro motor to prevent excessive pressure from developing on either side of motor 204. In addition, a check valve 373 is located in bypass 374 around the pump 250 so that should the engine stall and the pump 250 cease operating, the gyro motor 204 will function as a pump and continue to deliver fluid to the wheel motors of the vehicle until the kinetic energy of the gyro motor 207 is exhausted. In other words, when the pump 250 is discharging fluid under pressure, the valve 373 is closed by the pressure in the pump discharge line 351 but when the pressure in the line drops, the suction from the gyro motor 204 will open the valve 373 to provide an oil passage from the tank 160 through the gyro motor and then to the wheel motors.

It is therefore apparent that the force of gravity acting upon the gyro structure serves to precess the vehicle and maintain the axis of the gyro frame in the vertical position and that the torquing wheels 342 and 346 serve to torque the vehicle and cause precession of the gyro frame to maintain it in a normal position parallel to the longitudinal plane of the vehicle.

Referring to the second embodiment of the invention shown in FIGURES 12-16, this embodiment is similar to the first embodiment and like reference numerals are used to identify like parts in the two embodiments. However, in this embodiment, the gyro frame or support 193' is not sensitive to gravity upon tipping of the vehicle and torquing motors are supplied to torque the gyro frame in the required direction to keep the vehicle in upright equilibrium position. As in the first embodiment, torquing wheels 342 and 346 are supported on arms 340 and 344, respectively, attached to sleeves 317 and 327, respectively, which are connected with the motors 310 and 320, respectively, and these motors are pivotally secured to the gyro frame by pins 311a and 322, respectively. Also, a valve arm 302 is moved by the gyro frame to actuate the valve 305 which supplies fluid to one or the other of motors 310, 320 when the valve is moved from its nulled center position. The vehicle is supported by fore and aft running wheels which are constructed and steered in the same manner as in the first embodiment.

Referring to FIGURE 15, the gyro frame is supported by shafts 196' and 200', which are located in the bearing housing 194' and 202', respectively, and the axis of these shafts pass through the center of gravity of the gyro frame and rotor so that the gyro is not pendulous and gravitation force will not torque the gyro when the vehicle tips from the vertical. As in the first embodiment, the gyro support 193' contains the gyro rotor 207' which is mounted for rotation in the same manner as rotor 207 of the first embodiment and gyro motor 204 drives the rotor in the same manner. The gyro support 193' has a flat portion 375 from which projects a pin 376 at a location displaced forwardly from the axis of rotation of the gyro frame 193'. A first frame torquing motor 377 is pivotally attached at one end to pin 378 carried by lugs on the upright angle member 182. The end of shaft 379 of motor 377 connects to the pin 376. In a similar manner, motor 380 has one end pivotally connected to pin 381 carried by lugs on upright angle member 181 and the end of shaft 382 of motor 380 also connects to the pin 376.

The partial schematic of FIGURE 16 illustrates the manner in which torquing motors 377 and 380 may be connected in the hydraulic system illustrated in FIGURE 11. The torquing motors 377 and 380 are connected to the lines 306 and 307, respectively, leading to the torquing wheel motors 310 and 320, respectively, the connecting being by means of lines 384 and 385. Also, the torquing motors are connected to the exhaust line 370 through lines 386 and 387. From this schematic, it is apparent that when the gyro frame precesses from normal centered position upon tipping of the vehicle, the correct torquing motor 310 or 320 will be energized as in the prior embodiment to torque the vehicle and precess the gyro frame back to its centered position. At the same time, the proper torquing motor 377 or 380 will be energized to produce a torque upon the gyro frame to thereby precess the vehicle about the roll axis to an equilibrium position. Since the pin 376 is forward of the gyro frame axis and the torquing motor 380 is pressurized at the same time as torquing wheel motor 310, the force exerted by the torquing motor 380 will produce a counterclockwise torque on the gyro frame when viewed from above when the vehicle is tilted to the right from its equilibrium position when viewed from the rear. For the same reason, the motor 377 is pressurized simultaneously with torquing wheel motor 320. Thus, the torquing motors act on the gyro frame in the same direction as gravity acts in the first embodiment.

In both the first and second embodiments, the gyro frame axis is normally positioned in a vertical plane and the rotor spin axis is normally in a horizontal plane at right angles to the frame axis. However, in both of these embodiments, the frame axis and rotor axis can be placed in any orientation so long as the gyro remains responsive to a torque on the vehicle about the roll axis. As illustrated in FIGURES 17-20, the rotor spin axis can be normally in a vertical position and the frame axis is then normally in a horizontal position. In the following description of these figures, like reference numerals refer to like parts in the first and second embodiments. The bearing assemblies 191' and 192' are secured to side channels 152 and 153, respectively, by bolts 401 extending through back flanges 400. The structure of the bearing assemblies is the same as that illustrated in FIGURE 15. Fluid is introduced through passages 195 and 198 to the gyro motor 204 and exhausts from the gyro motor through the passages 205 and 203. The gyro motor is connected to the rotor shaft 211 and the other rotor shaft 212 is supported in bearings in the casing extension 216. The gyro casing 206 contains the gyro rotor 207 comprising hub 210, web 209 and rotor ring 208.

A sector gear 402 is mounted on the upper surface of casing 206 by means of bolts 403 so that the gear teeth 404 are located in a circular path about the axis of the frame 193'. The gear 405 is in mesh with gear 402 and is supported for rotation about a shaft 406 which extends through bearings 407 located in housing 408. The plate 409 is supported by four uprights 410 which are attached to the channels 152 and 153 in a rectangular arrangement so that one corner of the plate is attached to each upright. The end of shaft 406 projects through the bearing housing 408 and is splined to receive one end 415 of an arm 416. The other end of the arm 416 carries a weight 417. The fork 300 is attached to the end of the shaft 406 and contains a slot which receives the pin 301 attached to the lever arm 302. It is understood that the lever arm 302 is connected to the valve 305 in the manner illustrated in FIGURE 9.

The gear shaft 406 is in alignment with the rotor spin axis when the gyro frame 193' is in its normal position. When the vehicle experiences a torque about its roll axis, the gyro frame 193' will precess about its frame axis and thereby rotate the gear 402 which in turn will rotate the shaft 406 and gear 405 and move the lever arm 302. Also, by the attachment of the eccentric weight 417 to the normal vertical gear shaft 406, the center of gravity of the gyro frame and rotor is shifted from the axis of shaft 406 and the gyro assembly will be responsive to gravity when the vehicle and shaft 406 tilt from the vertical. This action of gravity will produce a torque on the gyro frame about the frame axis which will precess the vehicle back towards its normal centered position.

It is therefore apparent that the gyro assembly illustrated in FIGURES 17-20 will operate in a manner similar to the gyro assembly of the first embodiment and will control the torquing motors 310 and 320 for the torquing wheels 342 and 346, respectively. Also, it will be apparent that if the arm 416 with the weighted end 417 be detached from the shaft 406, the gyro assembly will no longer be responsive to gravity when the vehicle tips from its vertical position about the roll axis. The gyro can be equipped with a platform 375' having a projected pin 376' as illustrated in phantom in FIGURE 17 and the pin can receive the end of an arm 420 of a double acting actuator (not shown) supported at its end by the platform 409 in any suitable manner. Thus, by eliminating the arm 406 and providing actuator means for producing a torque upon the gyro frame through shaft 402 in the proper direction, upon movement of the arm 302, the gyro assembly will function in a manner similar to that of the second embodiment.

The gyro assembly of all of the embodiments can be provided with limit stops if desirable and for this purpose, the gyro casing 206 carries an arm 421 which is normally located below the bearing assembly 192'. Also, the back plate 400 for the bearing assembly 192' carries stops 422 and 423 which are located on opposite sides of the arm 421. Thus, the movement of the gyro frame in either direction is limited by the engagement of the arm 421 and one of the stops.

The present invention is operative with the gyro assembly mounted at various angles between the two positions which have been illustrated, since the spin axis will remain at right angles to the roll axis, it is understood that both the spin axis and the frame axis can deviate from this right angle position and the gyro assembly will still be operative. Also, in the various positions of the gyro assembly, the gyro assembly can be made sensitive to gravity.

The configuration of the vehicle can be modified depending upon the use of the vehicle and one or more of the wheels can be replaced by a continuous track, a sled or other support means. Any suitable type of power source can be utilized to drive the vehicle, the gyro motor and the other motor driven devices. Various other modifications are contemplated by those skilled in the art without departing from the spirit and scope of the invention.

What is claimed is:
1. A vehicle comprising:
   center-tracking, running wheels for supporting the vehicle for translational movement over a support surface and for roll freedom about a longitudinal axis;
   fluid motor means for driving one of said wheels;
   a gyro assembly having a gyro frame mounted for rotation about a frame axis and a gyro rotor mounted in said frame for rotation about a rotor axis, said frame axis and said rotor axis being positioned on the vehicle for precession of said frame in response to a torque on said vehicle about said roll axis;
   fluid motor means for driving said rotor about said rotor axis;
   motor driven pump means for supplying fluid under pressure to said gyro rotor driving motor and said wheel driving motor;
   said gyro rotor driving motor being operable as a fluid pump and connected to said gyro rotor to be driven as a pump by the kinetic energy of the rotor in the absence of fluid under pressure delivered by said motor driven pump; and
   means connecting the outlet of said gyro rotor driving motor to the inlet of said wheel driving motor to provide pressure fluid to said wheel driving motor in the absence of fluid under pressure from said motor driven pump.

2. The vehicle defined in claim 1 further comprising vehicle torquing means on the vehicle and engageable with a reaction surface fixed with respect to the support surface for applying a torque to the vehicle about said roll axis.

3. The vehicle defined in claim 2 further comprising hydraulic motor means for urging said vehicle torquing means into engagement with said reaction surface to produce a torque on the vehicle about said roll axis.

4. The vehicle defined in claim 3 further comprising means connecting the inlet of said hydraulic motor means to the outlet of said gyro rotor driving motor to provide pressure fluid to said hydraulic motor in the absence of fluid under pressure from said motor driven pump.

5. The vehicle as defined in claim 4 further comprising:
   fluid motor means mounted on the vehicle frame and operably connected to said gyro frame for applying a torque to said gyro frame to precess said vehicle about said roll axis; and
   means connecting the inlet of said gyro frame torquing motor means to the outlet of said gyro rotor driving motor to provide pressure fluid to said frame torquing motor in the absence of fluid under pressure from said motor driven pump.

6. A vehicle comprising:
   center-tracking, running wheels for supporting the vehicle for translational movement over a support surface and for roll freedom about a longitudinal roll axis;
   a gyro assembly having a gyro frame mounted for rotation about a frame axis and a gyro rotor mounted in said frame for rotation about a rotor axis, said frame axis and said rotor axis being positioned on the vehicle for precession of said frame in response to a torque on said vehicle about said roll axis;
   fluid motor means for driving said rotor about said rotor axis;
   motor driven pump means for supplying fluid under pressure to said gyro rotor driving motor;
   said gyro rotor driving motor being operable as a fluid pump and connected to said gyro rotor to be driven as a pump by the kinetic energy of the rotor in the absence of fluid under pressure delivered by said motor driven pump;
   vehicle torquing means on the vehicle and engageable with a reaction surface fixed with respect to the support surface for applying a torque to the vehicle about said roll axis;
   hydraulic motor means for urging said torquing means into engagement with said reaction surface; and
   means connecting the inlet of said hydraulic motor means to the outlet of said gyro rotor driven motor to provide pressure fluid to said hydraulic motor in the absence of fluid under pressure from said motor driven pump.

7. The vehicle defined in claim 6 further comprising means for applying a torque to said gyro frame about said frame axis to precess said vehicle about said roll axis.

8. The vehicle as defined in claim 7 wherein said gyro frame torquing means includes a fluid motor mounted on the vehicle and operatively connected to said gyro frame.

9. The vehicle as defined in claim 8 further comprising means connecting the inlet of said frame torquing motor to the outlet of said gyro rotor driving motor to provide pressure fluid to said frame torquing rotor in the absence of fluid under pressure from said motor driven pump.

10. The vehicle defined in claim 9 wherein said frame torquing motor means and said vehicle torquing motor means are connected in parallel so that the torque applied to said gyro frame about said gyro frame axis is a function of the torque applied to the vehicle about said roll axis.

11. A vehicle comprising:
   center-tracking, running wheels for supporting the vehicle for translational movement over a support surface and for roll freedom about a longitudinal roll axis;

a gyro assembly having a gyro frame mounted for rotation about a frame axis and a gyro rotor mounted in said frame for rotation about a rotor axis, said frame axis and said rotor axis being positioned on the vehicle for precession of said frame in response to a torque on said vehicle about said roll axis;

fluid motor means for driving said rotor about said rotor axis;

vehicle torquing means on the vehicle and engageable with a reaction surface fixed with respect to the support surface for applying a torque to the vehicle about said roll axis;

hydraulic motor means for urging said torquing means into engagement with said reaction surface;

fluid motor means for driving one of said wheels;

fluid motor means for applying a torque to said gyro frame about said frame axis to precess said vehicle about said roll axis; and motor driven pump means for supplying fluid under pressure to said gyro rotor fluid motor means, said hydraulic motor means, said wheel driving motor means and said gyro frame torquing motor means.

12. A vehicle as defined in claim 11 further including means mounting one of said wheels for movement to steer said vehicle.

13. A vehicle supported for roll freedom about a longitudinal roll axis spaced below the center of gravity of the vehicle comprising:

means forward and rearward of the vehicle center of gravity for supporting the vehicle for translational movement over a support surface;

a gyro frame mounted on the vehicle for rotation about a frame axis;

a gyro rotor rotatably mounted in said frame for rotation about a rotor axis, said frame axis and said rotor axis being positioned on said vehicle for precession of said frame in response to a force on said vehicle about said roll axis;

means connected with said vehicle and engageable with a reaction surface fixed with respect to the supporting surface for applying a torque on said vehicle about its roll axis in order to precess said gyro frame about said frame axis;

means for torquing said gyro frame about said frame axis to precess the vehicle about said roll axis, said frame torque being a function of said vehicle torque; and said frame torquing means comprising motor means connected with said vehicle and with said gyro frame at a position offset from said frame axis, said motor means being operable to rotate said gyro frame in either direction about said frame axis.

14. A vehicle supported for roll freedom about a longitudinal roll axis spaced below the center of gravity of the vehicle comprising:

means forward and rearward of the vehicle center of gravity for supporting the vehicle for translational movement over a support surface;

a gyro frame mounted on the vehicle for rotation about a frame axis;

a gyro rotor rotatably mounted in said frame for rotation about a rotor axis, said frame axis and said rotor axis being positioned on said vehicle for precession of said frame in response to a force on said vehicle about said roll axis;

means connected with said vehicle and engageable with a reaction surface fixed with respect to the supporting surface for applying a torque on said vehicle about its roll axis in order to precess said gyro frame about said frame axis; and means for torquing said gyro frame about said frame axis to precess the vehicle about said roll axis, said frame torque being a function of said vehicle torque; and said frame torquing means comprising a pair of torquing motors connected with said vehicle and with said gyro frame at a position offset from said frame axis, said motors being operable to torque said gyro frame in opposite directions about said frame axis.

15. A vehicle as defined in claim 14 having means responsive to movement of said gyro frame from its normal centered position for activating one of said torquing motors to produce a torque on said gyro frame in a direction to erect the vehicle toward its normal position.

16. A vehicle as defined in claim 15 wherein said vehicle torquing means comprises a pair of members attached to said vehicle one on each side of said roll axis and engageable with said reaction surface to produce a torque about said roll axis.

17. A verticle as defined in claim 16 having motor means for selectively urging said members into engagement with said reaction surface to apply a torque on the vehicle about said roll axis.

18. A vehicle as defined in claim 17 having control means operatively connected to said gyro frame for selectively actuating one of said motor means and one of said gyro frame torquing motors to place a torque on both said vehicle and said gyro frame.

19. A vehicle as defined in claim 17 wherein said vehicle torquing motors and said frame torquing motors are fluid motors, and wherein one of said frame torquing motors has its inlet connected in parallel with the inlet of one of said vehicle torquing motors and the other of said frame torquing motors has its inlet connected in parallel with the other of said vehicle torquing motors.

20. A stabilized vehicle comprising:

a large brute force gyroscope supported with two axes of freedom in addition to the spin axis of the gyro rotor;

said brute force gyroscope comprising a gyro rotor frame rotatably supported on said vehicle for gyroscopic precessional freedom throughout a substantial range about a frame axis providing one of said support axes;

means forward and rearward of the center of gravity of said vehicle for supporting said vehicle for translational movement over a supporting surface and for substantial precessional freedom about a longitudinal roll axis;

said roll axis providing the other of said support axes;

said supporting surface and said roll axis being situated below said center of gravity;

said frame being movable with said vehicle about said roll axis and movable relative to said vehicle about said frame axis;

said frame axis having a component parallel to a transverse plane perpendicular to said roll axis;

said brute force gyroscope comprising a gyro rotor mounted for rotation in said frame about said spin axis;

said spin axis being forced to move with said frame about said roll axis, and with said frame about said frame axis;

said frame having a normal position in which said spin axis has a component parallel to said transverse plane;

a sensor to detect displacement of said frame from said normal position;

means controlled by said sensor for subjecting said vehicle to torque applied about said roll axis, said vehicle additionally being subjected to disturbing torque acting at random about said roll axis;

means for imparting high spin velocity to said rotor so that the net roll torque represented by the algebraic sum of said roll torques causes precessional velocity of said frame about said frame axis, producing internal gyroscopic roll countertorque on said vehicle equal and opposite to said net torque;

said sensor controlled roll torque being applied upon a displacement of said frame from said normal position, in a direction to oppose said disturbing torque;
means for selectively applying precessional torque to said frame about said frame axis to cause precessional velocity of said vehicle about said roll axis in a direction corresponding to the direction of said sensor controlled roll torque;
said precessional velocity of said vehicle producing internal gyroscopic countertorque against said frame about said frame axis equal and opposite to said precessional frame torque;
said gyro frame being unrestrained by said frame torquing means to the extent that said gyro frame will precess throughout said range of precessional freedom at a rate substantially proportional to said net torque; and
said gyro rotor having sufficient angular momentum to provide short term stability for said vehicle about said roll axis.

21. A vehicle as defined in claim 20 wherein said means for torquing said vehicle comprises members attached to said vehicle and engageable with a surface fixed with respect to the supporting surface to selectively produce torques about said roll axis without tilting said vehicle.

22. A vehicle as defined in claim 21 having means for urging one of said members into engagement with said fixed surface independently of the other member.

23. A stabilized vehicle comprising:
a large brute force gyroscope supported with two axes of freedom in addition to the spin axis of the gyro rotor;
said brute force gyroscope comprising a gyro rotor frame rotatably supported on said vehicle for gyroscopic precessional freedom throughout a substantial range about a frame axis providing one of said support axes;
means forward and rearward of the center of gravity of said vehicle for supporting said vehicle for translational movement over a supporting surface and for substantial precessional freedom about a longitudinal roll axis;
said roll axis providing the other of said support axes;
said supporting surface and said roll axis being situated below said center of gravity;
said frame being movable with said vehicle about said roll axis and movable relative to said vehicle about said frame axis;
said frame axis being parallel to a transverse plane substantially perpendicular to said roll axis;
said brute force gyroscope comprising a gyro rotor mounted for rotation in said frame about said spin axis;
said spin axis being forced to move with said frame about said roll axis, and with said frame about said frame axis;
said frame having a normal position in which said spin axis is substantially parallel to said transverse plane;
a sensor to detect displacement of said frame from said normal position;
means controlled by said sensor for subjecting said vehicle to torque applied about said roll axis, said vehicle additionally being subjected to disturbing torque acting at random about said roll axis;
means for imparting high spin velocity to said rotor so that the net roll torque represented by the algebraic sum of said roll torques causes precessional velocity of said frame about said frame axis, producing internal gyroscopic roll countertorque on said vehicle equal and opposite to said net torque;
said sensor controlled roll torque being applied upon a displacement of said frame from said normal position, in a direction to oppose said disturbing torque;
means for selectively applying precessional torque to said frame about said frame axis to cause precessional velocity of said vehicle about said roll axis in a direction corresponding to the direction of said sensor controlled roll torque;
said precessional velocity of said vehicle producing internal gyroscopic countertorque against said frame about said frame axis equal and opposite to said precessional frame torque;
said gyro frame being unrestrained by said frame torquing means to the extent that said gyro frame will precess throughout said range of precessional freedom at a rate substantially proportional to said net torque; and
said gyro rotor having sufficient angular momentum to provide short term stability for said vehicle about said roll axis.

24. A vehicle as defined in claim 23 wherein said frame axis is substantially parallel to the longitudinal, vertical plane of said vehicle.

25. A vehicle as defined in claim 24 having means for spinning the gyro rotor in a counterclockwise direction when viewing the vehicle from its right side.

26. A vehicle as defined in claim 25 wherein:
said rearward means for supporting said vehicle comprises a running wheel;
a fluid motor for driving said running wheel;
fluid means for driving said rotor about said spin axis;
an engine driven pump for supplying fluid under pressure to said fluid motor and said fluid means;
means connecting said gyro rotor to said fluid means;
means operable in the absence of fluid under pressure delivered by said engine driven pump for operating said fluid means as a fluid pump by the kinetic energy of said rotor.

27. A vehicle as defined in claim 23 wherein said means for torquing said vehicle comprises a pair of members attached to said vehicle, one on each side of said roll axis and engageable with a surface fixed with respect to the supporting surface to produce a torque about said roll axis without tilting said vehicle.

28. A vehicle as defined in claim 27 having means for selectively urging said members into engagement with said fixed surface independently of each other.

29. A vehicle as defined in claim 28 wherein each of said members comprises:
an element for engaging the supporting surface and a motor for urging said element into contact with the supporting surface.

30. A vehicle as defined in claim 29 having means responsive to the position of said gyro frame for actuating one of said motors to torque said vehicle about said roll axis in the direction to return said gyro frame to its normal centered position.

31. A vehicle as defined in claim 30 wherein each of said contacting elements comprises a wheel movable into engagement with the supporting surface by one of said motors.

32. A vehicle as defined in claim 30 wherein said position responsive means comprises:
control means operatively connected to said frame for actuating one or the other of said motors depending upon the direction of movement of said frame.

References Cited

UNITED STATES PATENTS

| 991,485 | 5/1911 | Darrow | 74—5.22 X |
|---|---|---|---|
| 1,407,491 | 2/1922 | Sperry | 74—5.4 X |
| 2,558,562 | 6/1951 | Hutton | 180—66 X |
| 2,681,117 | 6/1954 | Marcy | 180—66 |
| 3,124,007 | 3/1964 | Swinney | 74—5.22 |
| 3,234,797 | 2/1966 | Kohman | 74—5.22 X |
| 3,277,840 | 11/1966 | Li | 105—145 |

FOREIGN PATENTS

| 980,529 | 1/1965 | Great Britain. |
|---|---|---|

KENNETH H. BETTS, *Primary Examiner.*